United States Patent
Mudarra

(10) Patent No.: US 10,777,092 B2
(45) Date of Patent: Sep. 15, 2020

(54) COMPACT PORTABLE BALLET TRAINING STATION

(71) Applicant: Tamara Mudarra, Homestead, FL (US)

(72) Inventor: Tamara Mudarra, Homestead, FL (US)

( * ) Notice: Subject to any disclaimer, the term of this patent is extended or adjusted under 35 U.S.C. 154(b) by 318 days.

(21) Appl. No.: 15/956,278

(22) Filed: Apr. 18, 2018

(65) Prior Publication Data

US 2019/0325781 A1     Oct. 24, 2019

(51) Int. Cl.
    *G09B 19/00*        (2006.01)
    *A63B 1/00*         (2006.01)

(52) U.S. Cl.
    CPC ............ *G09B 19/0015* (2013.01); *A63B 1/00* (2013.01); *A63B 2208/0204* (2013.01); *A63B 2210/50* (2013.01); *A63B 2244/22* (2013.01)

(58) Field of Classification Search
USPC ........ 434/247, 250, 255; 482/23, 34, 35, 38, 482/41, 42
See application file for complete search history.

(56) References Cited

U.S. PATENT DOCUMENTS

| | | | | |
|---|---|---|---|---|
| 2,124,146 A * | 7/1938 | Miller | ..................... | A45D 42/00 359/851 |
| 2,932,510 A * | 4/1960 | Kravitz | ..................... | A63B 3/00 482/38 |
| 4,126,307 A * | 11/1978 | Stevenson | ................ | A63B 1/00 248/363 |
| 4,258,915 A * | 3/1981 | Sellge, Jr. | .............. | A63B 69/00 248/440.1 |
| 4,696,470 A * | 9/1987 | Fenner | ..................... | A63B 1/00 182/153 |
| 5,389,055 A * | 2/1995 | Gangloff | ................ | A63B 1/005 482/142 |
| 5,403,223 A * | 4/1995 | Gaulkin | ................... | A63H 3/46 446/219 |
| 6,168,548 B1 * | 1/2001 | Fleming | ................... | A63B 3/00 482/23 |
| D487,124 S * | 2/2004 | Toniolo | ........................ | D21/691 |
| 6,962,421 B2 * | 11/2005 | Yang | ........................ | A47G 1/04 132/316 |
| 7,207,932 B1 * | 4/2007 | Dean | .................. | A63B 23/0211 482/140 |

(Continued)

*Primary Examiner* — Kurt Fernstrom
(74) *Attorney, Agent, or Firm* — Calrie Marsh, P.A.; Calrie Marsh, Esq.

(57) ABSTRACT

The present invention as described herein is a compact and portable ballet training station or kit. The training station comprises a collapsible bane with supporting bases, a foldable ballet mat, a folding mirror, and a compact carrying case. The collapsible barre is comprised of three bars, each bar with semi detachable segments positioned equidistant along each bar. Upon assembly the bars connect to each other to form a bane which is supported by bases. The foldable mat is made of one contiguous flexible matter which is sufficient to support and cushion the weight of a ballerina. The foldable mirror is made of one contiguous material capable of being coated with reflective material on one side and opaque material on the opposing side. These components are collapsed or folded into a hard shell quadrilateral shaped carrying case for easy storage and transport.

6 Claims, 3 Drawing Sheets

(56) References Cited

U.S. PATENT DOCUMENTS

| | | | |
|---|---|---|---|
| 7,347,573 B1 * | 3/2008 | Isler | A45D 42/10 359/854 |
| 7,476,187 B2 * | 1/2009 | Corte | A63B 1/00 482/141 |
| 7,608,029 B2 * | 10/2009 | Weiss | A63B 1/00 482/142 |
| D617,400 S * | 6/2010 | Hetzel | D21/691 |
| 8,197,391 B2 * | 6/2012 | Ruschell | A63B 1/00 482/35 |
| 8,651,676 B2 * | 2/2014 | Nottage | A45D 42/18 359/855 |
| 9,295,866 B2 * | 3/2016 | Kwo | A63B 1/00 |
| 10,010,735 B2 * | 7/2018 | Kwo | A63B 71/023 |
| 2004/0166994 A1 * | 8/2004 | Benefield | A63B 21/00047 482/23 |
| 2006/0154220 A1 * | 7/2006 | Toniolo | G09B 19/0015 434/250 |
| 2008/0108482 A1 * | 5/2008 | Macey | A63B 21/4037 482/23 |
| 2012/0077655 A1 * | 3/2012 | Wilson | A63B 3/00 482/142 |
| 2013/0345026 A1 * | 12/2013 | Eberflus | A63B 1/00 482/38 |
| 2015/0352401 A1 * | 12/2015 | Johnson | A63B 22/0235 482/54 |

* cited by examiner

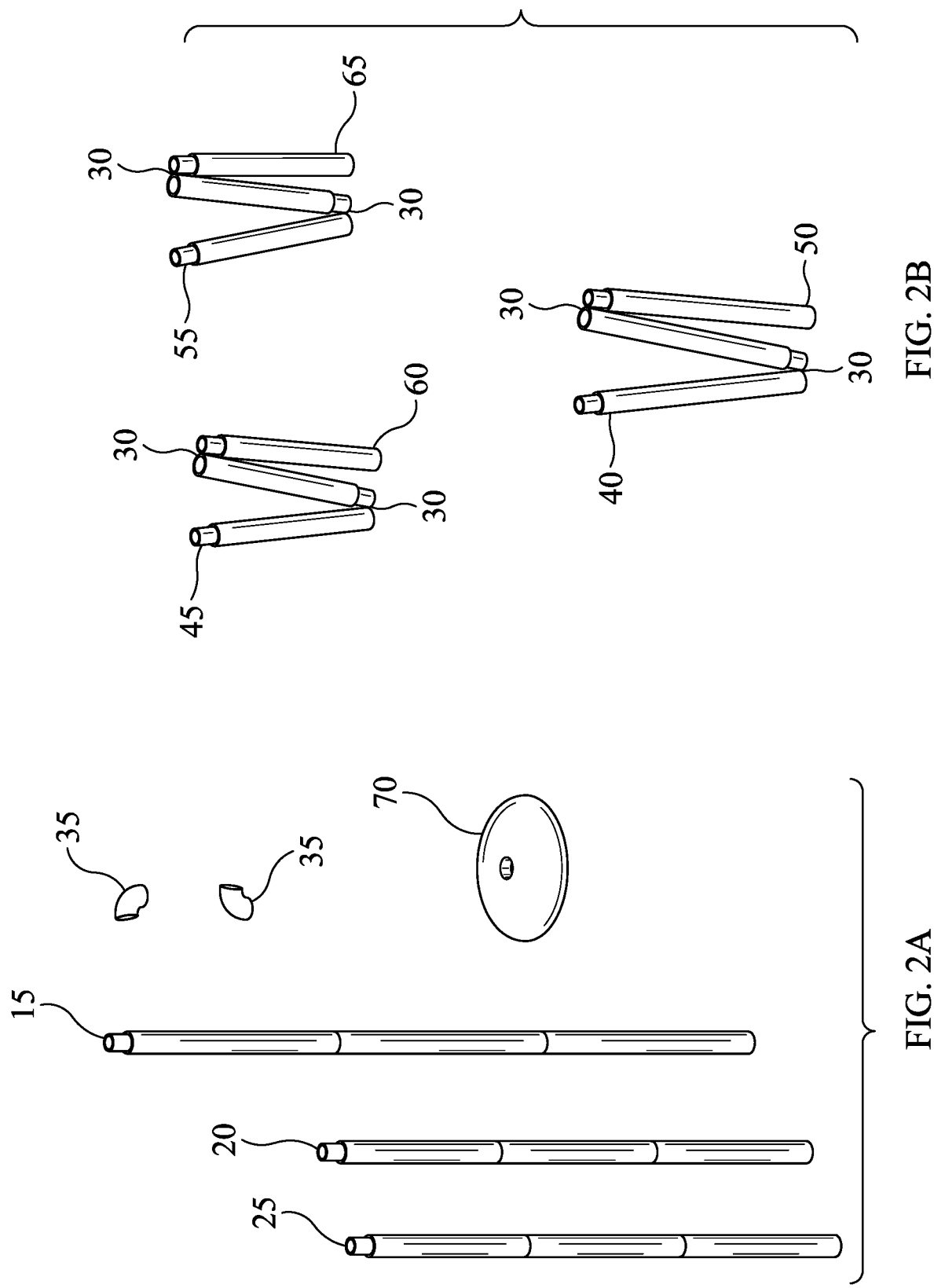

COMPACT PORTABLE BALLET TRAINING STATION

STATEMENT REGARDING FEDERALLY SPONSORED RESEARCH OR DEVELOPMENT

This invention has been created without the sponsorship or funding of any federally sponsored research or development program.

FIELD OF INVENTION

The present invention relates generally to a portable and compact ballet training station or apparatus for use by a traveling ballerina.

BACKGROUND OF THE INVENTION

Ballerinas are known for their dedication to their craft and spend a lot of time training and travelling for performances. Many ballerinas would like to train while traveling, whether at the airport, the hotel, or any available space when a dance studio is not readily available or may be cost prohibitive. Currently there are foldable ballet training stations, however they usually require complex assembly, are not structurally sturdy, are too heavy or cumbersome for transport, or a combination of these flaws. Furthermore, the ballet training stations present in the market are not readily available as one compact kit, but rather ballerinas are forced to gather the necessary parts and/or apparatus to achieve a complete and sturdy and training station.

This invention is focused on a compact and portable ballerina training station that is easy to transport with minimum disruption and is capable of being stored in discrete areas.

SUMMARY OF THE INVENTION

The present invention is directed towards a compact and portable ballerina training kit for easy transport and storage without sacrificing sturdiness and optimal function. The invention combines items needed for ballet training with minimal assembly required and maximum efficiency.

The present invention is a compact portable ballet training station or kit comprising of a collapsible barre, a foldable ballet mat, a folding mirror, and a compact carrying case. Although these elements may exist individually, the design of the barre in particular, is novel and the mode of combining these components is novel to the industry.

BRIEF DESCRIPTION OF THE DRAWINGS

In describing the invention, reference will at times be made to the accompanying drawings in which:

FIG. 2A is a side view of the unassembled barre component of the invention

FIG. 2B is a front view of the folded bars of the barre component of the invention

DESCRIPTION OF THE INVENTION

Figure 1:
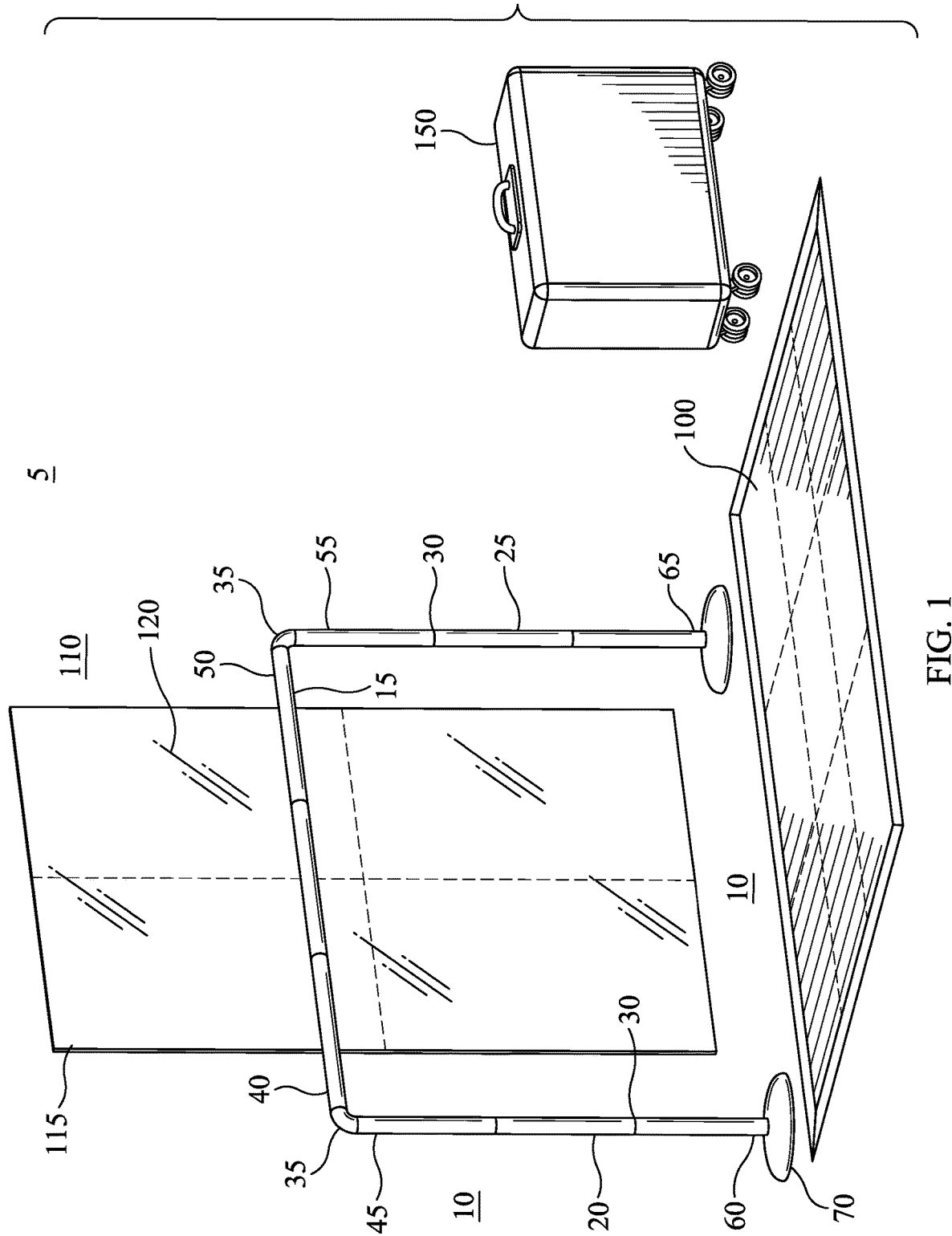
FIG. 1 is a perspective view of the components of the invention.
Figure 4:
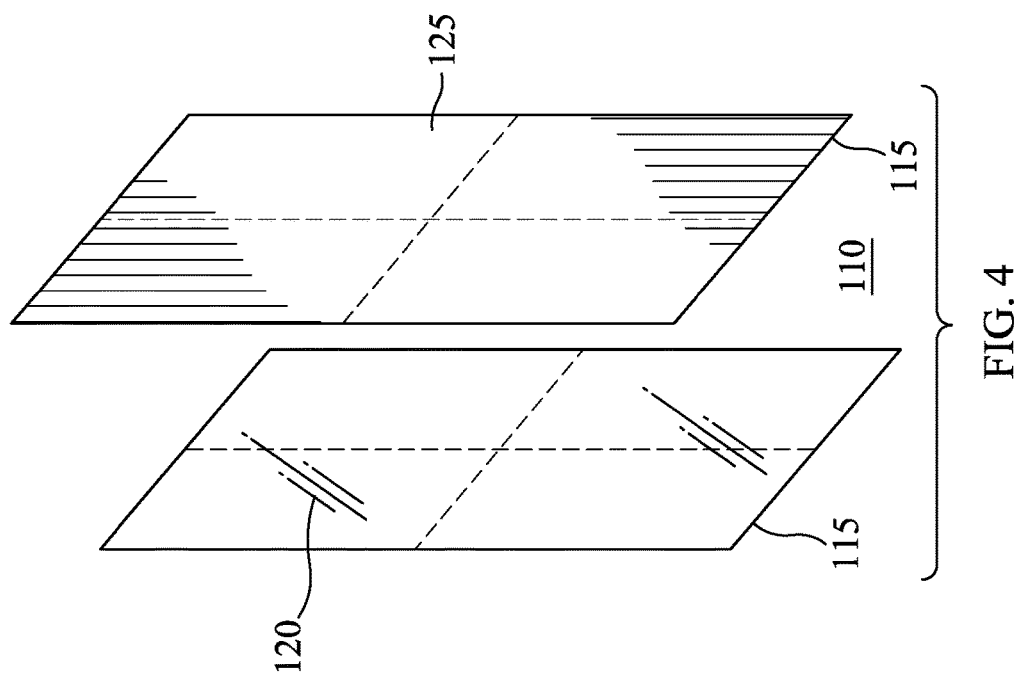
FIG. 4 is a side view of the front and back of the foldable mirror component of the invention.
Figure 3:
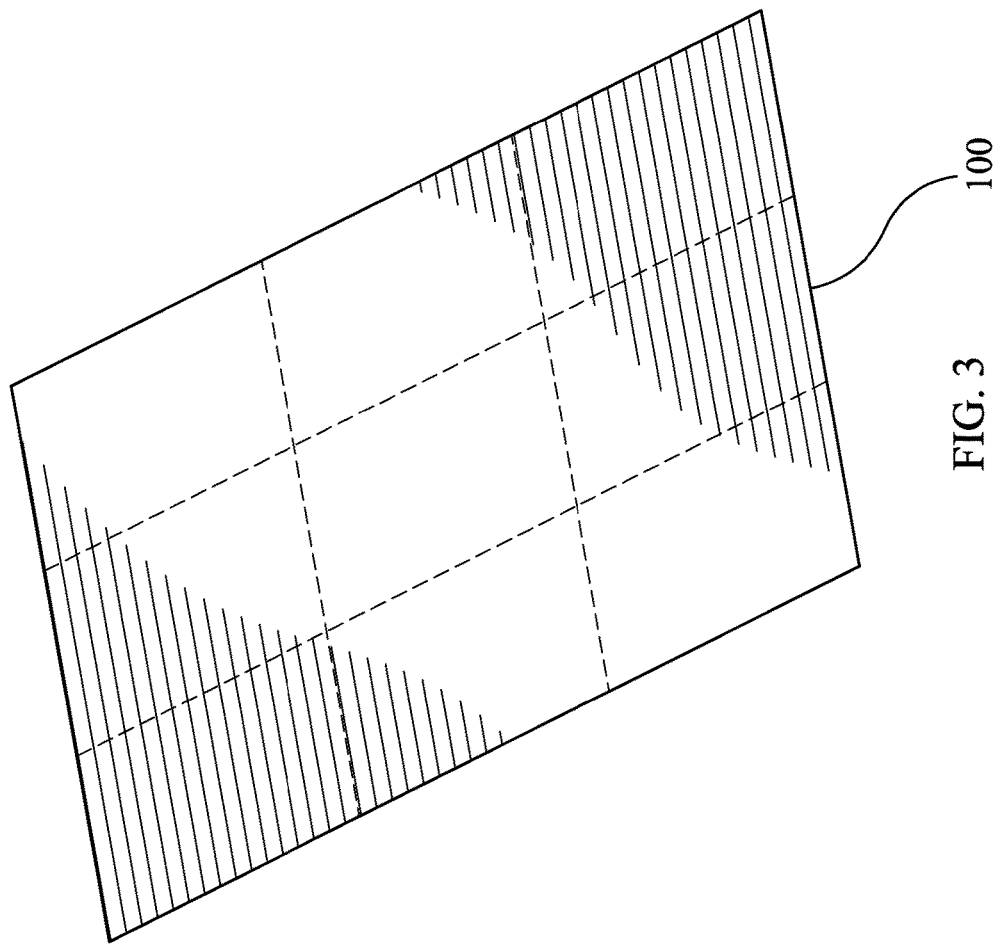
FIG. 3 is a top view of the foldable mat component of the invention.

Before the subject invention is described further, it is to be understood that the invention is not limited to the particular embodiments of the invention described below, as variations of the particular embodiments may be made and still fall within the scope of the invention. It is also to be understood that the terminology employed is for the purpose of describing particular embodiments, and is not intended to be limiting.

The details of one or more embodiments of the invention are set forth in the accompanying drawings and the description below. Other features, objects, and advantages of the invention will be apparent from the description and drawings, and from the claims. In the following description, numerous specific details are set forth to provide a thorough understanding of the embodiments. One skilled in the art to which this invention belongs will recognize, however, that the techniques described can be practiced without one or more of the specific details, or with other methods, components, materials, etc. In other instances, well known structures, materials or operations are not shown or described in detail to avoid obscuring certain aspects.

In this specification, the singular forms "a," "an" and "the" include plural reference unless the context clearly dictates otherwise. Unless defined otherwise, all technical and scientific terms used herein have the same meaning as commonly understood to one of ordinary skill in the art to which this invention belongs.

The present invention comprises a compact portable ballet training station 5 or kit comprising of a collapsible barre 10, a foldable ballet floor mat 100, a foldable mirror 110, and a compact carrying case 150. The collapsible barre has three bars, a top bar 15, a first side bar 20, and a second side bar 25, each of which are collapsible or foldable by means of semi-separable joints 30 or connection points located equidistant along the length of the bars 15, 20, and 25. Each bar 15, 20, and 25 includes 2 or more joints 30 to facilitate folding/collapsing for easy storage and transport. For assembly, each bar 15, 20, or 25 is extended at its joints 30 and securely connected to each other by a fastening means 35. A first end 40 of the top bar 15 is connected to a first end 45 of the first side bar 20 by way of the fastening means 35; and a second end 50 of the top bar 15 is connected to a first end 55 of the second side bar 25. A second end 60 of the first side bar 20 and a second end 65 of the second side bar 25 serve as the base or support for the assembled barre apparatus 10. The second end 60 of the first side bar 20 and the second end 65 of the second side bar 25 may each have a rounded base 70 having dimensions required to accommodate the weight of the assembled barre 10 to ensure balance and sturdiness. The rounded bases 70 are essential for stabilizing the first side bar 20 and the second side bar 25 sufficiently to support and withstand the force/pressure applied by the ballerina to the assembly 10 during training. The pressure exerted by an average ballerina may be in the range from 2.4 to 10.4 Pascals over an area of about 5 cm$^2$ depending on whether she is flat on her feet or in the releve en pointe position. Depending on the ballerina's position or dance pose, the area over which pressure is exerted may increase upwards of 8 cm$^2$. The dimensions of the rounded bases 70 may be adjusted to accommodate a minimum pressure of 2.4 Pascals and a maximum pressure upwards of 16.4 Pascals exerted by ballerina and may be customized according to the weight and height range of ballerinas. The dimensions and geometric shape of the bases 70 may vary, including but not limited to an increase or decrease in circumference, or having an oval, rectangular, or other polygonal shape. In the preferred embodiment, the rounded bases 70 may be removable for easy storage and transport. Alternatively, in other embodiments the rounded bases 70 may be permanently affixed to the second end 60 of the first side bar 20 and the second end 65 of the second side bar 25, respectively.

The foldable mat 100 is made of flexible durable material sufficient to withstand the pressure and weight of a ballerina as well as provide necessary cushion for the ballerina's joints during training. The foldable mat 100 may have varying dimensions to accommodate the training space required and/or the number of ballerinas training in the space. For example, the foldable mat may have a thickness ranging from 0.06 inches up to 0.5 inches with varying length, width, and weight. The foldable mat 100 may consist of one contiguous flexible material which may be folded or rolled neatly, where once folded or rolled it creates a flat non-bulky item for easy storage. In an alternative embodiment, the foldable floor mat 100 may be comprised of non-contiguous flexible material having separable sections/segments which connect securely to form a large floor mat. The floor mat 100 may be made of thin, but durable material having a layer of cushion to accommodate the pressure/force exerted by a ballerina, without slipping or moving about once in place. The floor mat 100 material must be lightweight which is essential for facilitating easy transport.

The foldable mirror 110 may be made of flexible material capable of being bent without damage or distortion. The foldable mirror 110 comprises brushing the surface of a flexible and sturdy material 115 with reflective material 120. The reflective material 120 may consist of liquid metal having reflective properties or a mixture of chemicals or a mixture of elements having reflective properties. The reflective material 120 would be brushed on one side of the flexible and sturdy material 115 and the other side of the flexible and sturdy material would be coated with an opaque substance/coloring 125. In the preferred embodiment, the foldable mirror 110 is comprised of one contiguous material capable of being repeatedly folded and unfolded with minimal damage. In alternate embodiments, the mirror 110 may comprise of non-contiguous material having separable components, which components securely connect to each other form a large mirror or reflective apparatus.

The carrying case 150 for the components 5 of the present invention described above comprises a small and compactly designed case similar to a rolling bag, carry-on, or hard-shell case. The carrying case 150 is designed to fit the foldable and lightweight components 5 of the present invention. The carrying case 150 may include compartments to specifically fit each component of the present invention and may vary in dimensions accordingly. The carrying case 150 may also be comprised of durable fabric or material capable of withstanding rigorous transport and serve as a protective barrier for the components 5 of the invention described herein.

As various changes can be made in the above-described subject matter without departing from the scope and the spirit of the invention, it is intended that all subject matter contained in the above description, shown in the accompanying drawings, or defined in the appended claims will be interpreted as descriptive and illustrative, and not in a limiting sense. Many modifications and variations of the present invention are possible in light of the above teachings. It is therefore to be understood that within the scope of the appended claims, the invention may be practiced otherwise than as specifically described.

EQUIVALENTS

Those skilled in the art will recognize, or be able to ascertain using no more than routine experimentation, many equivalents to the specific embodiments of the invention described herein. Such equivalents are intended to be encompassed by the claims.

What is claimed is:

1. A compact and portable ballet station comprising a collapsible bane with removable rounded support bases, a foldable mat, a foldable mirror, and a compact carrying case wherein:

the collapsible barre comprises three bars, a top bar, a first side bar, and a second side bar; whereby each bar has at least two segments created by semi-separable joint means located equidistant along the length of each bar, for collapsing said bar without completely detaching each segment of the bar; whereby each bar has the same length and dimensions; whereby each bar has fastening means at their opposing ends for connecting the top bar to the first side bar on one end and connecting the top bar to the second side bar on the opposing end to form the bane; whereby upon connection, the top bar is supported by and connected to the first side bar and the second side bar, which both bars extend to the floor; whereby the first side bar and the second side bar are each attached separately to a removable rounded support base, completing the assembly of the barre; and the foldable mat component is composed of flexible durable material sufficient to withstand the pressure and weight of a ballerina, comprising of one contiguous foldable material, which is folded for storage and transport; and the foldable mirror component is comprised of one contiguous flexible material capable of being folded and capable of being coated with reflective liquid metal on one side and coated with opaque material on the opposing side; and the compact carrying case for the unassembled barre, the foldable mat, and the foldable mirror is comprised of an outer shell made of durable plastic or polycarbonate, having the shape of a quadrilateral, and having a hollow interior for securely storing the components of the ballerina training station; and which carrying case has at least two swivel wheels attached to its bottom most part and a handle attached to its top most part for transporting the components of the ballerina training station.

2. The compact and portable ballet station as in claim 1, wherein the removable rounded support bases are capable of supporting pressure exerted by a ballerina in a range of 2.4-16.4 Pascals over an area in the range of 5 $cm^2$ to 8 $cm^2$.

3. A compact and portable ballet station comprising a collapsible bane with removable rounded support bases, a mat, a mirror, and a compact carrying case wherein:

the collapsible barre comprises three bars, a top bar, a first side bar, and a second side bar; whereby each bar has at least two segments created by semi-separable joint means located equidistant along the length of each bar, for collapsing said bar without completely detaching each segment of the bar; whereby each bar has the same length and dimensions; whereby each bar has fastening means at their opposing ends for connecting the top bar to the first side bar on one end and connecting the top bar to the second side bar on the opposing end to form the bane; whereby upon connection, the top bar is supported by and connected to the first side bar and the second side bar, which both bars extend to the floor; whereby the first side bar and the second side bar are each attached separately to a removable rounded support base, completing the assembly of the barre; and the mat component is comprised of non-contiguous flexible durable material having separable segments which connect to form a mat capable of withstanding pressure of at least 2.4 Pascals, and which segments disconnect for ease of storage and transport; and the mirror component is comprised of one contiguous flexible material capable of being folded and capable of being coated with reflective liquid metal on one side and coated with opaque material on the opposing side; and the compact carrying case for the unassembled bane, the segments of the mat, and the foldable mirror is comprised of an outer shell made of durable plastic or polycarbonate, having the shape of a quadrilateral, and having a hollow interior for securely storing the components of the ballerina training station; and which carrying case has at least two swivel wheels attached to its bottom most part and a handle attached to its top most part for transporting the components of the ballerina training station.

4. The compact and portable ballet station as in claim 3, wherein the removable rounded support bases are capable of supporting pressure exerted by a ballerina in a range of 2.4-16.4 Pascals over an area in the range of 5 cm$^2$ to 8 cm$^2$.

5. A compact and portable ballet station comprising a collapsible bane with removable rounded support bases, a mat, a mirror, and a compact carrying case wherein:

the collapsible barre comprises three bars, a top bar, a first side bar, and a second side bar; whereby each bar has at least two segments created by semi-separable joint means located equidistant along the length of each bar, for collapsing said bar without completely detaching each segment of the bar; whereby each bar has the same length and dimensions; whereby each bar has fastening means at their opposing ends for connecting the top bar to the first side bar on one end and connecting the top bar to the second side bar on the opposing end to form the bane; whereby upon connection, the top bar is supported by and connected to the first side bar and the second side bar, which both bars extend to the floor; whereby the first side bar and the second side bar are each attached separately to a removable rounded support base, completing the assembly of the barre; and the mat component is comprised of non-contiguous flexible durable material having separable segments which connect to form a mat capable of withstanding pressure of at least 2.4 Pascals, and which segments disconnect for ease of storage and transport; and the mirror component is comprised of non-contiguous material having separable segments which connect to form a mirror, and disconnect for ease of storage and transport, and which segments are capable of being coated with reflective liquid metal on one side and coated with opaque material on the opposing side; and the compact carrying case for the unassembled bane, the segments of the mat, and the foldable mirror is comprised of an outer shell made of durable plastic or polycarbonate, having the shape of a quadrilateral, and having a hollow interior for securely storing the components of the ballerina training station; and which carrying case has at least two swivel wheels attached to its bottom most part and a handle attached to its top most part for transporting the components of the ballerina training station.

6. The compact and portable ballet station as in claim 5, wherein the removable rounded support bases are capable of supporting pressure exerted by a ballerina in a range of 2.4-16.4 Pascals over an area in the range of 5 cm$^2$ to 8 cm$^2$.

* * * * *